(12) United States Patent
Garwin et al.

(10) Patent No.: US 9,066,063 B2
(45) Date of Patent: Jun. 23, 2015

(54) ENHANCED PROGRAM VIEWING METHOD

(71) Applicants: International Business Machines Corporation, Armonk, NY (US); Sandra Levine, Somers, NY (US)

(72) Inventors: Richard L. Garwin, Scarsdale, NY (US); James L. Levine, Somers, NY (US)

(73) Assignee: International Business Machines Corporation, Armonk, NY (US)

( * ) Notice: Subject to any disclaimer, the term of this patent is extended or adjusted under 35 U.S.C. 154(b) by 33 days.

(21) Appl. No.: 13/968,653

(22) Filed: Aug. 16, 2013

(65) Prior Publication Data
US 2013/0330058 A1 Dec. 12, 2013

Related U.S. Application Data

(63) Continuation of application No. 12/051,639, filed on Mar. 19, 2008, now abandoned, which is a continuation of application No. 10/994,247, filed on Nov. 23, 2004, now abandoned.

(51) Int. Cl.
| H04N 7/16 | (2011.01) |
| --- | --- |
| H04N 7/173 | (2011.01) |
| G06F 3/00 | (2006.01) |
| H04N 9/87 | (2006.01) |
| H04N 21/262 | (2011.01) |
| H04N 21/432 | (2011.01) |
| H04N 21/658 | (2011.01) |
| H04N 5/93 | (2006.01) |
| H04N 21/426 | (2011.01) |
| H04N 21/45 | (2011.01) |
| H04N 21/84 | (2011.01) |
| H04N 21/845 | (2011.01) |
| H04N 21/8549 | (2011.01) |

(52) U.S. Cl.
CPC ............. *H04N 9/87* (2013.01); *H04N 7/17318* (2013.01); *H04N 21/26258* (2013.01); *H04N 21/4325* (2013.01); *H04N 21/6581* (2013.01); *H04N 5/93* (2013.01); *H04N 21/42646* (2013.01); *H04N 21/4532* (2013.01); *H04N 21/84* (2013.01); *H04N 21/8456* (2013.01); *H04N 21/8549* (2013.01)

(58) Field of Classification Search
CPC .................. H04N 21/23418; H04N 21/47202
See application file for complete search history.

(56) References Cited

U.S. PATENT DOCUMENTS

| 5,243,419 A | * | 9/1993 | Faryar et al. ............... 348/426.1 |
| 6,829,582 B1 | | 12/2004 | Barsness | |

(Continued)

FOREIGN PATENT DOCUMENTS

EP 1202571 5/2002

*Primary Examiner* — Gigi L Dubasky
(74) *Attorney, Agent, or Firm* — Whitham Curtis Christofferson & Cook, PC; Daniel P. Morris

(57) ABSTRACT

A user is provided with the capability to view only those segments of TV broadcast programs and/or pre-recorded digital programs that are identified by the user (or other persons, e.g., parents) as acceptable. Preferences for the types of material that is desired for viewing are provided. The provider analyzes a selected program and creates a user specific segmentation file that, when played along with the recorded program, causes the program to automatically skip specific types of material (e.g., commercials, violence, pornography, etc.) and/or jumps to specific material desirable without the user having to intercede during the viewing. The segmentation file is distributed to the user and the user provides a fee to the provider for making and distributing this customized segmentation file.

4 Claims, 3 Drawing Sheets

(56) References Cited

U.S. PATENT DOCUMENTS

| | | |
|---|---|---|
| 2002/0059588 A1 | 5/2002 | Huber et al. |
| 2003/0206720 A1 | 11/2003 | Abecassis |
| 2008/0060001 A1 | 3/2008 | Logan et al. |
| 2008/0276790 A1 | 11/2008 | Lemons |
| 2011/0093492 A1* | 4/2011 | Sull et al. ............ 707/769 |

* cited by examiner

ENHANCED PROGRAM VIEWING METHOD

BACKGROUND OF THE INVENTION

1. Field of the Invention

The present invention generally relates to a method for enhanced viewing of digital video recordings, including both purchased video disks and material recorded by the viewer. More particularly, it relates to a method that enables a user to identify specific program segments that are to be viewed and/or segments which are not desirable to be viewed. These selected segments of the identified program can be viewed or skipped without the user's intervention during the specific program viewing.

2. Background Description

A recording of a television broadcast made using a digital video recorder (DVR) or a digital recording available on Digital Video Disks (DVDs) provides a user with random access to the stored video data in compressed digital form. These television or other programs may contain certain program segments (e.g., commercials, pornographic, or otherwise undesirable material, geographically relevant segments, etc.) which are or are not of interest to the user. Present digital video recording systems enable a viewer to identify specific programs by either one of several methods (e.g., title, time, channel, keyword, etc.) to be recorded. However, present DVR technology does not typically allow a user to specify the desirable viewing segments within a program. Users can record selected program and then manually select segments to be skipped or replayed during the viewing of the program. This requires intervention by the user to view the programs in a non-sequential manner.

Additionally, pre-recorded programs available on DVD also have an ability for the data to be accessed in a non-sequential manner. This access is managed using "track lists" which consist of a set of beginning and ending image numbers which are typically stored on the DVD with the program file. These track lists are commonly selected as "chapters" or "scenes" from the DVD viewing menu. However, the user is limited to those tracklists provided on the DVD.

SUMMARY OF THE INVENTION

The present invention is directed to a method for viewing or not viewing selected segments within a program without the intervention of the user during the viewing. This capability is provided by a method that creates special data files, referred to as segment files, which are stored separately from the video program data files. The files include coded descriptors characterizing the contents of each video segment selected by a Provider, and are distributed to a user for a fee. The selection criteria of the segmentation are generally defined by the provider, with optional input from the user. The user would then view the video material under control of a computer program. This program would make a decision to display or not display each video segment by comparing its segment descriptor to a set of preferences specified by the user. A particular advantage of this type of viewing is that that it allows a parent precise control of the video material viewed by a child.

In addition to content descriptors, other types of information can be stored in the segment files, for example the names of actors in a particular scene, or a command to pause the video. These too can be used to enhance the viewer's experience.

The use of a segment file as described above provides the viewer with a considerable control over how the video is viewed. However, it is also possible for the provider to optionally supply one or more tracklists, which only provide the sequence of video segments to display. These can be based on user preferences supplied to the provider, or may be based on a set of typical preferences, e.g., suitable for pre-teenagers.

An exemplary object of the invention is to provide a computer implemented method for creating, editing, and distributing a segment file which describes the content of selected video segments of either a personally recorded video program or a purchased pre-recoded video disk. Other digital information may optionally be stored along with the segment descriptors.

Another exemplary object of this invention is to provide a method for the viewer of said video material to use the segment file to enhance the viewing of the video by selecting segments to display or skip according to the viewer's preferences, and by use of the optional information.

Yet a further exemplary object of this invention is to provide one or more simple tracklists instead of, or in addition to, a complete segment file, along with a method to select a track list and use it to display its sequence of video segments.

Still another exemplary object of the invention is to make the segment file and/or tracklists for the identified program available to the user through any one of several transmission means ranging from Internet to postal carrier mail of a file disk. Preferably, the invention enables the Provider of the segment file to collect fees from the user before the program can be viewed as the selected segments.

According to the invention, there is provided a methodology that will accept subscriber (also called user) information and create a user profile. The user profile will include user address and billing information. It will optionally include special viewing preferences for desirable or undesirable program segment types, or for other types of information to be stored in the segment file, such as the names of actors in the segments. The methodology will provide the ability for a user to identify a program to be viewed and the Provider will analyze the identified program to create a segment file. Optionally, the user may request one or more simple tracklists specifying only the order in which to display the video segments.

The file or files can then be distributed to the user, preferably but not limited to, through the Internet. Furthermore, the methodology will preferably enable the provider to collect fees for the creation and distribution of the segment file (e.g., there will be a mechanism for prohibiting viewing of the user specific segment files until after fees are paid (the mechanism for prohibiting can be implemented before distribution of the file or after distribution of the file (e.g., an activation code being required for a distributed file))).

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
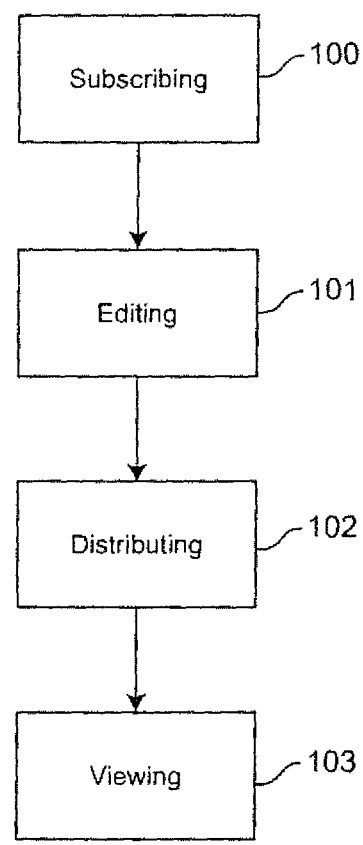
FIG. 1 is a high level block diagram of the four main steps of the enhanced program viewing method.

Referring now to the drawings, and more particularly to FIG. 1, there is shown a very simple diagram of the four steps of the methodology. The initial step of subscribing 100 refers to the creating of a user account and a user preference profile. Standard user accounting applications can be used to accept user data such as name, mailing address, billing information. A software application could be used to enable the user to specify general viewing preferences much in the same way as travel applications allow a user to select seating and meal preferences for booking airline tickets. These general preferences would be used each time a particular user accesses the system and identifies a new program for viewing. The subscriber 100 step would also allow one-time users such that user profiles were not stored as an account. The subscribing step 100 would also allow modifications to the general preferences as well as allowing specific preferences on a program-by-program basis.

For example, a sports fan user might subscribe to the system and have general preferences that edit programs such that all commercial segments are skipped. The sports fan user might then request a viewing of some pre-recorded programs of the up coming winter Olympics. The sports fan user may identify specific preferences for these winter Olympics programs to only show skiing events and/or not show skating events. These preferences for skiing events would be on a one-by-one program basis while the general preferences of not showing commercials would be a continuous preference.

The key activity of the provider is the editing step 101. It is at this step that video program material will be analyzed to create a segment file. This step is labor intensive, and therefore expensive, and would only be done for video material for which there is likely to be a strong demand, such as a major sports event, a popular broadcast movie, or a popular video disk. When appropriate, tracklists will also be created. The descriptors which are used to characterize the segments will depend on the nature of the material, and also on the typical preferences in the data base of user profiles. The editing step will be described in more detail in FIG. 2.

Continuing with FIG. 1, the segment file and/or tracklists will be customized according to the user's profile, and then distributed to the user at the distribution step 102. One example of customization is to select only tracklists suitable for 10 year old children. The provider can transmit the files to a user through any one of several means. These means can include, without limitation: creating a random access physical media file that is mailed through the postal carrier system, creating an electronic file that is sent through the Internet as an e-mail, and/or is downloaded by the user from the Providers web site. As electronic files are commonly distributed to end users, any number of distribution systems can be used as those familiar with the art can understand and the invention is not limited to the systems mentioned. As part of the distribution step 102, the provider would include a payment capability such that the file would either not be distributed or be distributed in a way that would prohibit use (e.g., file encryption, password protection, etc.) unless payment is received. Payment could be received in several ways such as an electronic funds transfer (e.g., credit card, debit card, wire transfer, etc.) had been processed as part of the subscribing step.

Finally, the viewing step 103 enables the identified program to be viewed such that the program shows only those segments whose descriptors correspond to the preferences of the subscribing user. Alternatively, a tracklist can be used to display the desired video sequence. To expand on the example above, the sports fan user has a Digital Video Recorder (DVR) system at home. The sports fan user knows the Olympics are to be broadcast, verifies that the provider intends to create a segment file for the event, and sets up the DVR to record the Olympic broadcasted programs. The user then accesses the enhanced program viewing system, either as a new, one-time or returning user and enters a preference for a tracklist showing only skiing events, without commercials. Of course, viewing can be performed at any time selected by the user. A focus of the invention is to provide a user with a means for viewing only selected segments of a selected program that are customized by his or her preferences.

Figure 2:
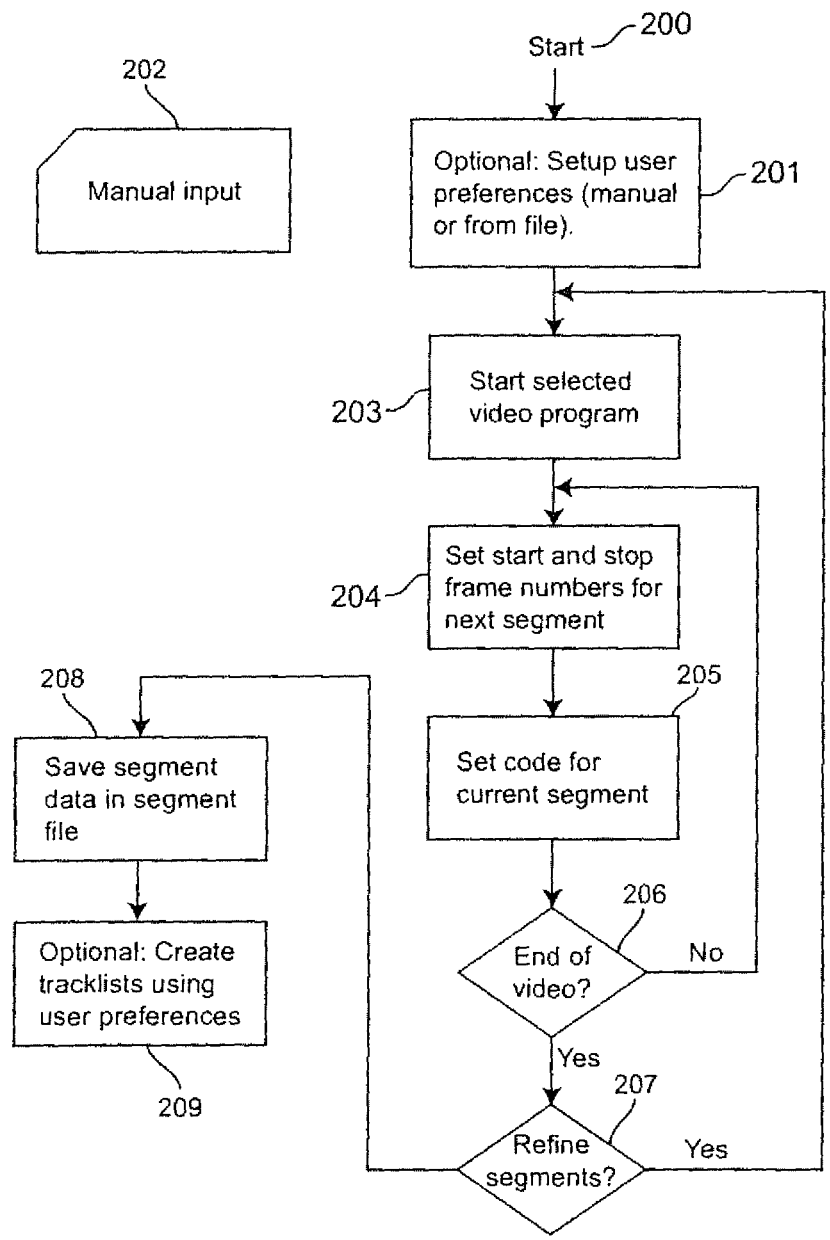
FIG. 2 is a flow chart of the editing step within the methodology.

FIG. 2 provides a flow chart of the editing step 101 which creates the segment file for a selected program. This file will consist of a list of editor-selected start and stop frame numbers, along with an editor selected descriptor code describing the content of the frame. Optional extra data, such as an action to be taken, may be included with the descriptor. The descriptor can consist of, for example, a string of 64 bits, where a 1 in a particular bit position indicates that a particular content is present in the segment. This conveniently allows for multiple content types in the same segment, and simplifies comparison with the user preferences. A few bits can be used to indicate the presence of additional data. Such data can be used to select a video blurring region, to point to sound effect information, as a command to pause the video, etc. Many other coding schemes are of course possible. The editor may be a human, a program running in processing unit 1, or a combination thereof. In the case of a human, the editor's intent will be transmitted via manual device 202. In the following description, we assume a human editor, but it is likely that a preliminary editing step to delineate segments of potential interest will be done by a computer program. For example, a sound recognition program could locate possible gunshots indicating violence, or words suggesting sexual content.

In FIG. 2, editing begins at 200. First, a set of preferences are optionally entered in step 201, either manually via input device 202, or from a predefined file. These will be used to create optional specific tracklists. The manual device 202 may be a remote controller, keyboard, mouse, touch screen, etc., or a combination thereof. The editor then begins viewing the program at step 203. The editor then delineates the first segment of interest, using input device 202 to mark the beginning and ending video frames. The video will then be automatically paused to allow the editor to set the code for the segment in step 205, again using device 202. At 206, a test is made to see if the video has ended. If not, the program branches back to step 204 to delineate the next segment, and so on. It should be noted that segments may contain other segments, or may overlap one another. For example, a segment with violence might contain a segment with strong language. The processor can check for this and break the segments into smaller sequential segments.

If the video has ended, the editor is prompted in step 206 to optionally restart the video in order to modify or refine the segment frame numbers and/or coding. For example, the editor can use input device 202 to adjust the starting and ending frames of the segment and modify the coding. If this is not needed, the segment data is saved in a file at step 208. If preferences were entered in step 201, then tracklists respecting them will be created as well.

In a variation of this methodology, step 205, in which the segment codes are set, may be omitted for the first pass through the video. That is, only the segment starting and ending frame numbers will be set. For the second pass, the video will be automatically stopped for each segment to allow the coding to be performed. Once the viewing file is created, it is forwarded to the user through the distribution step 102 and viewed as described above in FIG. 1.

Figure 3:
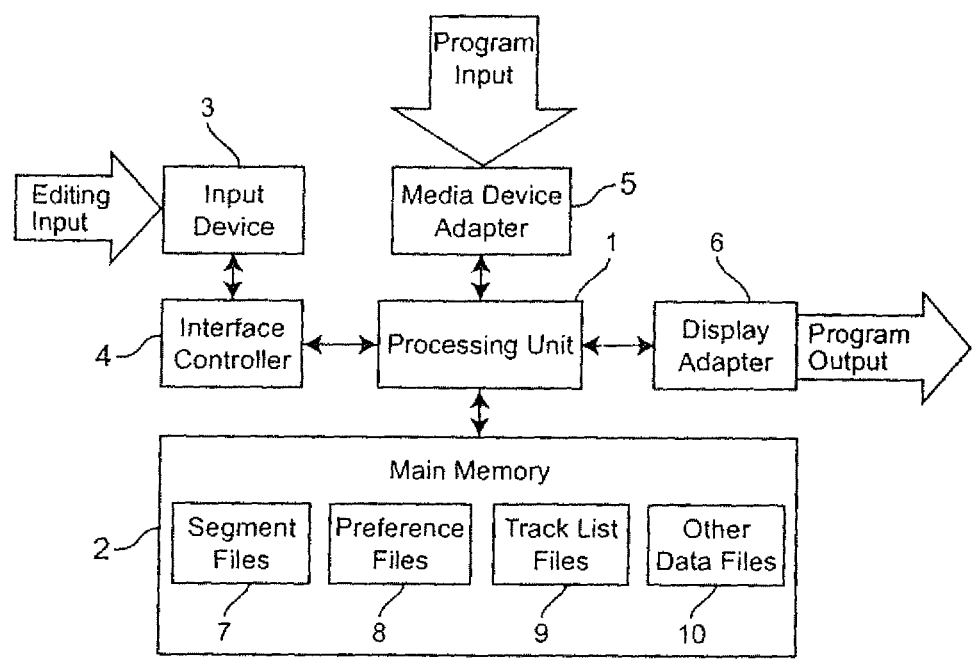
FIG. 3 is a simple block diagram of a system that would provide the means for viewing of a program.

A schematic view of the elements which may be used in the practice of the invention are shown in FIG. 3. The same basic elements can be used for viewing and editing, although the software will be different. To access and/or utilize the computer implemented video viewing enhancement system, a processing unit 1, which is the central processing device of the system, is accessed and controlled using an input device or devices 3, which may include a TV-type remote controller for a television set, a computer mouse, a keyboard, a touch screen, a tablet, or any number of other input devices. Input device 3 interfaces to processing unit 1 through interface controller 4. Processing unit 1 receives digital video frames from media device adapter 5, and can signal the media device to start, stop, change direction and speed, and jump to selected frames. Processing unit 1 decompresses the digital frames and feeds them to display adaptor 6, which outputs the video signal for display on a display unit (not shown). Processing unit 1 also obtains data from the main memory 2. In particular, this memory holds the files delivered by the Provider, specifically segment file 7, optional track lists 9, and "other data" file 10, as well as preference file 8. Preference file 8 may be created by the user with input device 3. Alternatively, it may be distributed by the Provider and optionally modified by the user with input device 3. As discussed below, not all of these files are required for basic operation but may be useful in different embodiments of the invention.

During basic enhanced viewing, in which pre-selected content is simply suppressed, processing unit I will retrieve a descriptor number from segment file 7, compare the characterization codes with the allowed codes stored in the preference file 8, and use them to make a decision as to whether or not to display the segment. If the segment is satisfactory, the system will display all frames within in sequence. If not, the system will search the segment file for the first satisfactory segment and direct the media device to advance to that frame number. It will also calculate the location of the next descriptor in the segment file 7 to be used. The necessary processing can easily be performed during the vertical retrace time between frames.

It is possible that the Provider's digital copy of a program and the User's digital copy will have different start times, so that the frame numbers of the two copies will differ by an offset. If the content start is identified in the transmission, the offset can be determined directly. If the content start is not transmitted or is obscured, the offset can be determined by including a video frame in the data file sent by the Provider to the User. This would be taken from the Provider's copy of the program, e.g., the first complete and reasonably complex image. Before starting the enhanced video system playback, the offset would be found by a digital search for the matching frame in the User's copy. Many approaches can be used for this digital match, including a simple byte-by-byte comparison. Another approach is that taught in Jason Study Report (JSR-97-145) by W. Press, R. Garwin and W. Dally, published by The Mitre Corporation, Jason Program Office, 1820 Dolley Madison Blvd., McLean, Va. 22102, pp. 7-8.

As a further-enhancement selected from the preference file 8, extra information may be displayed on the screen as an overlay, for example the actors' names. In this case, the descriptor codes would include a numbered entry point into the "other data" file 10. Other types of information which may be stored in the other data file and presented to the user include sound effects, vibration effects, presentations of text and/or graphical information, etc.

In yet another mode of operation, the processor unit 1 will ignore the segment file 7 and simply display sequences of video frames in accordance with a pre-defined track list chosen by the User from the track list files 9. The Provider can make use of the user's preference file 8 stored in the Provider's user profile, in combination with segment file 7, to create these track lists for the track list file 9, or may provide a standardized set of track lists based on typical user preferences.

While the invention has been described in terms of its preferred embodiments, those skilled in the art will recognize that the invention can be practiced with modification within the spirit and scope of the appended claims.

Having thus described our invention, what we claim as new and desire to secure by Letters Patent is as follows:

1. A program viewing method for one or more subscribed users, comprising the steps of:
    creating a segment file on provider storage media from a provider copy of a specific video program, wherein the segment file is a list of start and stop frame numbers delineating segments of the specific video program, with descriptors for each segment;
    calculating location of a next descriptor in the segment file during a vertical retrace time between frames;
    executing a sound recognition program when the segment file is created which locates one or more of possible gunshots indicating violence and words suggesting sexual content, and identifying one or more segments having either said possible gunshots or said words with descriptors;
    receiving from a subscribed user one or more preferences;
    creating one or more tracklist files on the provider storage media, wherein each tracklist file comprises selected segments from the segment file and is created using the one or more preferences;
    distributing one of the one or more tracklist files and one or more preference files to the subscribed user; and
    fee-collecting from the subscribed user before the specific video program can be viewed by the subscribed user using the distributed tracklist file,
    wherein each distributed tracklist file enables display of selected segments of a user copy of the specific video program,
    wherein when the provider copy of the specific video program and a user copy of the specific video program have different start times, then one or more of the following occurs:
        a digital search is performed and an offset is found for a matching frame in the user copy, before display of selected segments of the user copy, before display of selected segments of the user copy of the specific video program,
        if a content start is identified in a transmission, then, an offset is determined directly, and
        if a content start is not transmitted or is obscured, then an offset is determined by including a video frame in one of said preference files or tracklist files, and
    wherein each step is performed by one or more computers.
2. The method of claim 1, further comprising checking for overlapping segments, wherein the checking is performed by a processor.
3. The method of claim 2, further comprising breaking into smaller sequential segments, performed by a processor.
4. The method of claim 1, further comprising adjusting starting and ending frames of the segment.

\* \* \* \* \*